United States Patent [19]

Hall et al.

[11] Patent Number: 5,258,244
[45] Date of Patent: Nov. 2, 1993

[54] REVERSIBLE AUTOMATIC CELL BYPASS CIRCUIT

[75] Inventors: Thomas C. Hall, Irvine; George A. Larchian, Northridge, both of Calif.

[73] Assignee: Hughes Aircraft Company, Los Angeles, Calif.

[21] Appl. No.: 803,807

[22] Filed: Dec. 9, 1991

[51] Int. Cl.⁵ .......................................... H01M 10/46
[52] U.S. Cl. ...................................... 429/61; 429/90; 337/15
[58] Field of Search ................... 429/7, 61, 90, 92; 337/15

[56] References Cited

U.S. PATENT DOCUMENTS

| | | | |
|---|---|---|---|
| 3,213,345 | 10/1965 | Loftus | 337/15 |
| 4,774,558 | 9/1988 | Herrin | 357/28 |
| 4,882,239 | 11/1989 | Grimmer et al. | 429/7 |
| 4,910,103 | 3/1990 | Yoshikawa et al. | 429/61 |
| 4,935,315 | 6/1990 | Herrin | 429/50 |
| 4,992,340 | 2/1991 | Tidwell et al. | 429/61 X |
| 5,017,856 | 5/1991 | Johnson | 429/7 X |

Primary Examiner—Stephen Kalafut
Attorney, Agent, or Firm—M. E. Lachman; M. W. Sales; W. K. Denson-Low

[57] ABSTRACT

A bypass circuit for a rechargeable battery cell has first and second normally open switches in parallel across the cell. The first switch, which can be a backward-biased rectifier, shunts the discharge current between the cell terminals if the battery cell fails but reopens if the battery cell recovers. The second switch shunts the charging current between the cell terminals if the battery cell fails but reopens if the cell recovers. The second switch can be a normally open FET transistor biased to close only when the cell voltage $V_C$ substantially exceeds a normal peak charging voltage $V_P$. A rechargeable battery system in which the cells are series connected can incorporate a separate bypass circuit across each cell to enable the remaining good cells to continue charging and discharging even if a particular cell fails.

10 Claims, 4 Drawing Sheets

REVERSIBLE AUTOMATIC CELL BYPASS CIRCUIT

BACKGROUND OF THE INVENTION

1. Field of the Invention

The present invention relates to rechargeable electrical battery systems, and more specifically to systems for automatically protecting against failure of particular cells.

2. Description of Related Art

Electrical power supplies that depend on a number of rechargeable cells connected in series have a great variety of uses, particularly for portable equipment. However, one weakness of these systems is that if a single cell in the series becomes defective it usually acts as a very high resistance or open circuit, making it impossible to efficiently recharge or discharge the remaining series-connected cells. This is particularly undesirable when the power supply is intended for automatic use at a remote location, such as in telemetering the condition of distant oil wells, powering space satellites or similar applications.

To circumvent this problem, a number of ways for automatically detecting and bypassing a cell failure have been developed. For example, to maintain the ability to discharge the remaining operative cells, a separate power rectifier for the anticipated maximum load current is coupled in parallel across each cell, the diode being oriented for reverse-bias when the cell is operating normally. If a cell fails during discharge, the voltage supplied by the remaining operative cells will forward bias the diode, allowing the diode to shunt the discharge current across the single failed cell.

However, adding such rectifiers does not enable the remaining operative cells to be recharged since the recharging current would have to flow in the rectifier's "OPEN" or high resistance direction. Therefore, some bypass circuit is required to effectively shunt any defective cell. For example, Herrin's U.S. Pat. No. 4,774,558, assigned to the same assignee as the present application, requires the use of a shunt rectifier which includes a solder preform that melts when the rectifier shunts a defective cell because of heat given off by the conducting rectifier. The melted preform permanently shorts out the defective cell.

Another way of permanently conductively shorting out a defective cell is described in U.S. Pat. No. 4,935,315 also owned by the assignee of this application. When a light emitting diode in parallel across a defective cell begins to conduct, electromagnetic radiation given off by the diode, such as heat or light, is detected by a sensing circuit. The sensing circuit then closes a latching relay which shunts the defective cell. Although during manufacture the latching relay is initially in the "OPEN" state, once it receives a command to "CLOSE", it remains latched in the "CLOSED" state.

Unfortunately such permanent or irreversible shunting has the disadvantage that should a shunted cell recover, the shunting function cannot automatically be removed. Moreover, the various thermal and mechanical ways of shunting a defective cell have further disadvantages: 1) an identical rectifier structure which includes meltable solder might accidently be damaged when soldering a terminal connection; 2) a relay can fail when exposed to vibration or acceleration; and 3) at high current levels the closure of the fused alloy switch may present high initial contact resistance and high power dissipation leading to switching reliability problems.

Therefore, there is a need for an automatic cell bypass device that supports both charging and discharging of the remaining operative cells yet is reversible, preferably automatically. There is also a need for such a device which operates as a solid state device for greater reliability.

SUMMARY OF THE INVENTION

In accordance with the invention, a bypass circuit for a rechargeable battery cell has first and second normally open switches in parallel across the cell. The first switch, which can be a reverse-biased diode, shunts the discharge current between the cell terminals if the battery cell fails but reopens if the battery cell recovers. The second switch shunts the charging current between the cell terminals if the battery cell fails but reopens if the cell recovers. The second switch can be a normally open FET transistor biased to close only when the cell voltage $V_c$ substantially exceeds a normal peak charging voltage $V_p$.

A rechargeable battery system in which the cells are series connected can incorporate a separate bypass circuit across each cell to enable it to continue charging and discharging even if a particular cell fails. Because the shunting of a failed cell is automatically reversible if the cell recovers, the battery system is more efficient than prior systems in which the shunting is permanent.

DESCRIPTION OF THE PREFERRED EMBODIMENTS

Figure 1:
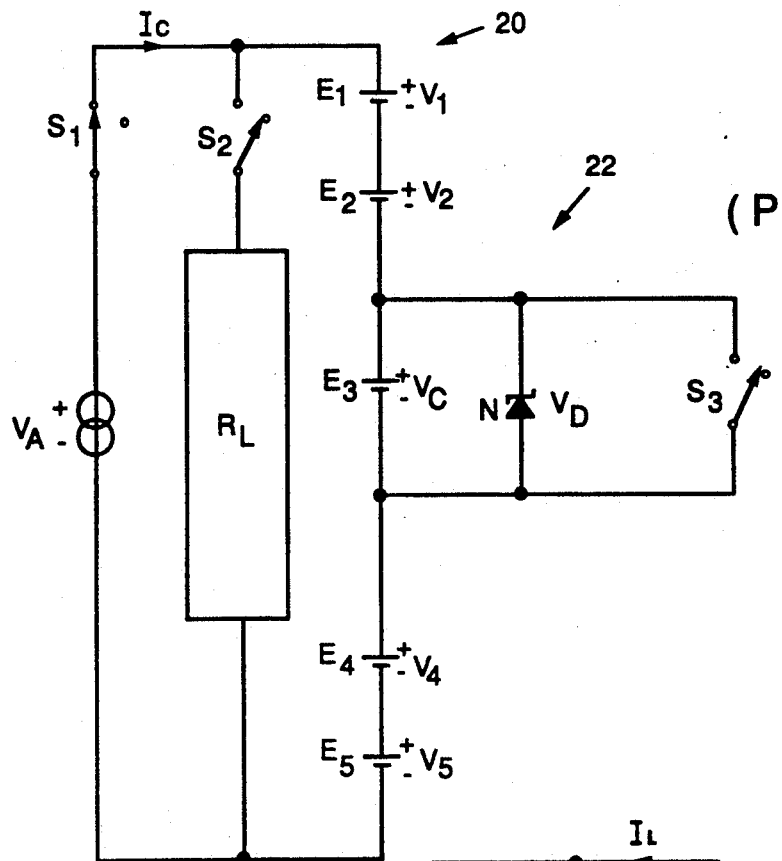
FIG. 1 is a schematic of a rechargeable battery system having a prior art irreversible cell bypass circuit, as seen when all the cells are functioning normally and being charged.

A rechargeable battery system 20 of FIG. 1 shows an example of the prior art technique and circuit parameters involved. To illustrate typical values of the parameters, assume that the battery system provides power for a satellite, though the invention has much broader applications. During a charging mode a switch $S_2$ is opened to disconnect a relatively low resistance load $R_L$, representing the satellite's equipment, from the power supply. A switch $S_1$ is closed to connect up a D.C. voltage generator $V_A$ in series with rechargeable battery cells $E_1$ through $E_5$. Switches $S_1$ and $S_2$ are basic to the satellite system operation and are common both to prior art and this invention. Since they are known in the art they are therefore not discussed in detail herein. D.C. generator $V_A$, such as a solar panel made from a silicon voltaic array, then provides a charging current $I_C$ to series cells $E_1$ through $E_5$.

To provide protection against a malfunctioning battery cell, a separate irreversible automatic bypass circuit 22 is connected in parallel across each cell, though for simplification only circuit 22 for cell $E_3$ is shown. Bypass circuit 22 is formed by a rectifier N in parallel with a normally open switch $S_3$. Rectifier N is oriented so that the voltage $V_C$ developed in a properly functioning cell $E_3$ by generator $V_A$ biases the diode OPEN. Therefore, during normal charging of cell $E_3$ circuit 22 appears as an open circuit not interfering with the functions of battery system 20 or cell $E_3$.

In the example of a power supply for a satellite, each of cells $E_1$ through $E_5$ could be a nickel/hydrogen electrochemical cell designed to produce about 1.55 volts each at 25° C. During charging the silicon voltaic array could be designed to develop about 8.5 volts across the series of five cells, or about 1.7 volts per cell. Thus a reverse voltage $V_C \approx 1.7$ volts across cell $E_3$ biases the rectifier OPEN.

Figure 2:
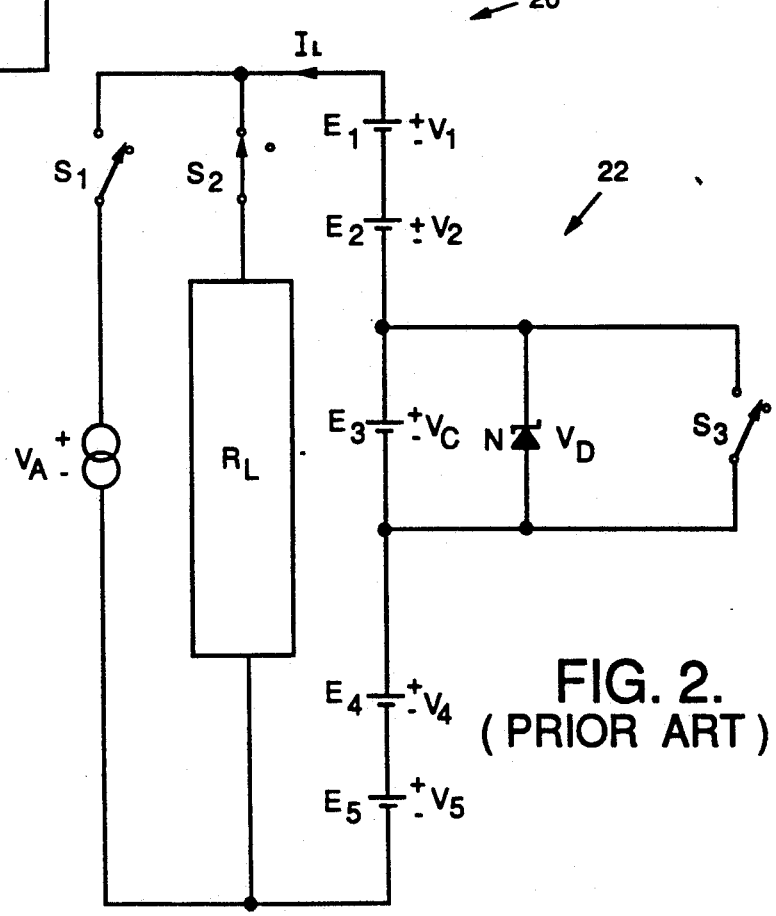
FIG. 2 shows the prior art battery system of FIG. 1 when all the cells are functioning normally and being discharged into a load.

Then, as shown in FIG. 2, during a discharge mode switch $S_1$ is opened to disconnect generator $V_A$, and switch $S_2$ is closed to connect load $R_L$ to cells $E_1$ through $E_5$. If all the cells are working properly, each produces a positive voltage $E_0$ in the discharge mode, so the rectifier N remains biased OPEN. The five cells $E_1$ through $E_5$ then provide a combined voltage $5E_0$, which produces a discharge current $I_L$ into load $R_L$ to power it. Generally, the peak of discharge current $I_L$ is much higher than the peak of charging current $I_C$. That is, a relatively low current $I_C$ is used to charge the cells over a long period of time but relatively large discharge currents flow for short periods to power equipment represented by load $R_L$.

In the example of a power supply for a satellite, each of the cells will produce about 1.5 volts, so $V_C = E_0 \approx 1.5$ volts to bias rectifier N in its OPEN mode. A typical peak charging current $I_C$ is several orders of magnitude less than the typical peak discharge current.

Now suppose that during the discharge mode of FIG. 2 cell $E_3$ fails, so that it exhibits only a relatively high resistance compared to load $R_L$. If the rectifier N and switch $S_3$ were both to remain OPEN, then since load $R_L$ and the failed cell $E_3$ are in series, the voltage $4E_0$ produced by the remaining four good cells $E_1$, $E_2$, $E_4$, $E_5$ would mostly appear across the defective cell as a voltage $V_C \approx -4E_0$.

But if $V_C$ becomes negative, rectifier N will be biased CLOSED in the forward, current conducting state, shunting failed cell $E_3$. Moreover, if rectifier N is chosen to have a relatively low forward resistance when CLOSED compared to $R_L$, the voltage $4E_0$ produced by the remaining four good cells $E_1$, $E_2$, $E_4$, $E_5$ will appear across load $R_L$ as a voltage $\approx 4E_0$. In other words, if cell $E_3$ fails during discharge, rectifier N will CLOSE, shorting out the failed cell so the voltage $4E_0$ of the remaining good cells can be delivered to the load.

Instead of flowing through the failed cell, discharge current $I_L$ will flow in the forward direction through the CLOSED rectifier. If only one cell of the five has failed, discharge current $I_L$ will still be about 4/5 of the discharge current when all the cells are operative. Thus rectifier N should be selected to have a much lower forward resistance than load $R_L$ and to withstand the relatively high current expected in the load.

In the example of a power supply for a satellite, to handle the $R_L$ load current a semiconductor device N is needed which can be a high current, high efficiency rectifier that can handle large amperage in the forward direction. For example, it can be a Schottky barrier rectifier, such as IN6392 which is generally available in the semiconductor device industry.

When such a rectifier is conducting or CLOSED, it will have a forward voltage of relatively low magnitude $|V_F|$, typically about 0.5 volts. That is, in FIG. 2, when cell $E_3$ fails and rectifier N begins conducting, the voltage across bypass circuit 22 will be $V_C - |V_F| \approx -0.5$ volts.

Now suppose that after rectifier N automatically shunts failed cell $E_3$ to maintain the discharge function, the remaining good cells are so discharged by load $R_L$ that the power supply is switched to the charging mode as shown in FIG. 1. Previously, when cell $E_3$ was operating properly, voltage $V_C$ across cell $E_3$ during the charging mode was of a polarity and magnitude to bias rectifier N in the OFF state. In the example of a power supply for a satellite, this was $V_C \approx +1.7$ volts. But when cell $E_3$ fails, its internal impedance becomes much higher than that of the remaining good cells. This greatly reduces charging current $I_C$ and also causes a much greater proportion of positive charging voltage $V_A$ to appear across $E_3$. That is, in the charging mode even if cell $E_3$ has failed, the rectifier N remains OPEN and does not help restore normal charging.

For this reason, in the prior circuits such as Herrin's U.S. Pat. No. 4,774,558, once rectifier N becomes conducting during the discharge mode to compensate for a failed cell $E_3$, a mechanism is provided to permanently close an additional switch $S_3$. For example, in Herrin's U.S. Pat. No. 4,774,558 when the rectifier N conducts, it generates heat which melts a solder preform, permanently closing switch $S_3$. In the previously referenced U.S. Pat. No. 4,935,315, there is disclosed a system in which electromagnetic radiation given off by the rectifier, such as heat or light, is detected by a sensing circuit which closes a latching relay to permanently close switch $S_3$.

Such permanent shunting has the disadvantage that even if a shunted cell spontaneously recovers, its function cannot be restored. Moreover, such circuits are inefficient in that switch $S_3$ is made capable of handling high, bi-directional currents when all that is needed to restore the charging function is a switch $S_3$ capable of handling relatively low charging current $I_C$ in the direction opposite that permitted by rectifier N.

Figure 3:
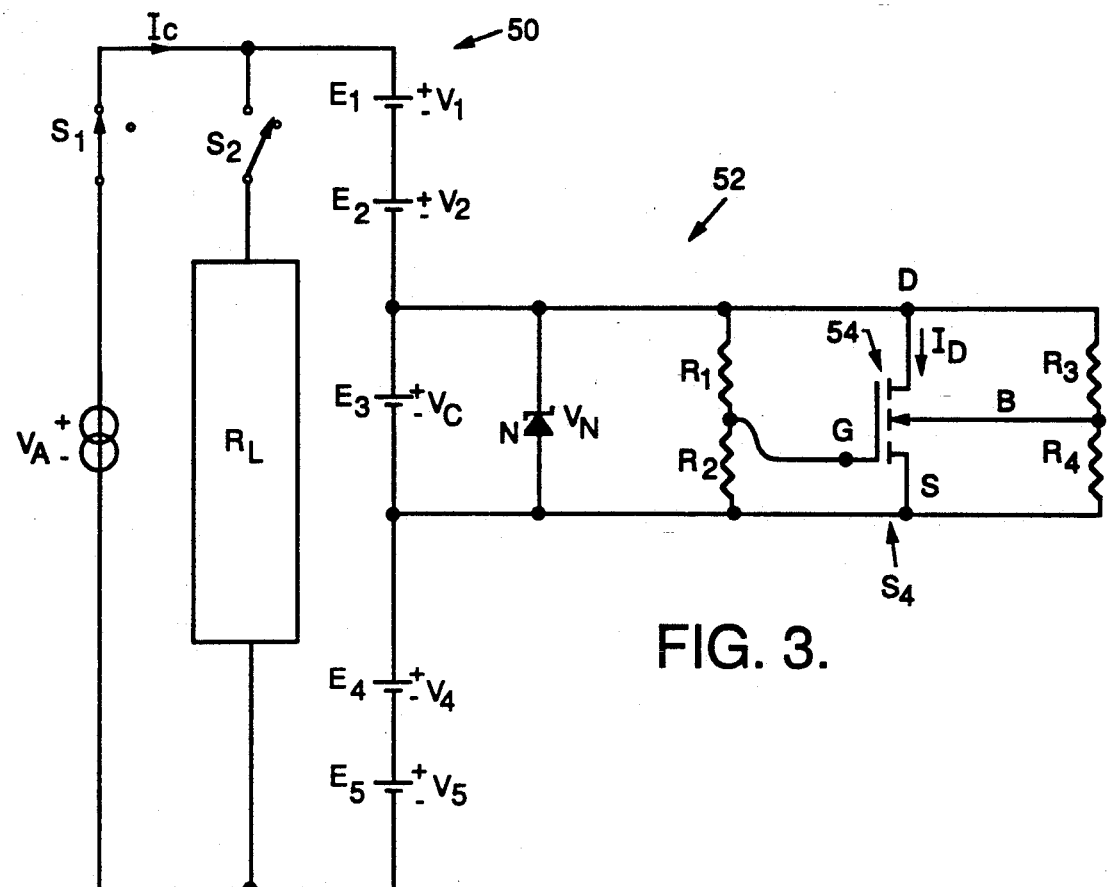
FIG. 3 is a schematic of a rechargeable battery system having a reversible cell bypass circuit according to the present invention, as seen when all the cells are functioning normally and being charged.

To overcome these difficulties, FIG. 3 shows a rechargeable battery system 50 having an embodiment of a reversible cell bypass circuit 52 according to the present invention, as seen when all the cells are functioning normally and being charged. A separate reversible automatic bypass circuit 52 is connected in parallel across each cell, though for simplification only bypass circuit 52 for cell $E_3$ is shown. Bypass circuit 52 is formed by a relatively high current rectifier N in parallel with a normally open, relatively low current electronic switch $S_4$.

During the charging mode switch S₂ is open to disconnect load R_L, and switch S₁ is closed to connect generator V_A in series with cells E₁ through E₅. The positive voltage V_C developed in a properly functioning cell E₃ by generator V_A biases rectifier N in OPEN state.

During charging and when all the cells are operating properly, voltage V_C across cell E₃ will not exceed some positive maximum V_P. Normally open electronic switch S₄ is designed to close when voltage V_C is positive and rises substantially above V_P. In the example of a power supply for a satellite, V_P ≈ 1.7 volts. Therefore, during normal charging of cell E₃ both rectifier N and electronic switch S₄ are OPEN and bypass circuit 52 does not affect the functions of battery system 50 or cell E₃.

In FIG. 3 an example of an electronic switch S₄ is shown which is made from an enhancement-mode N-channel FET switch S₄, such as a 3N170 FET made by Intersil or Siliconix, and resistors R₁ and R₄. The N-channel FET S₄ is a four terminal device in which the source is N-type, D is an N-type drain, B is a P-type substrate, and G is a gate insulated from the substrate (IGFET).

Figure 4:
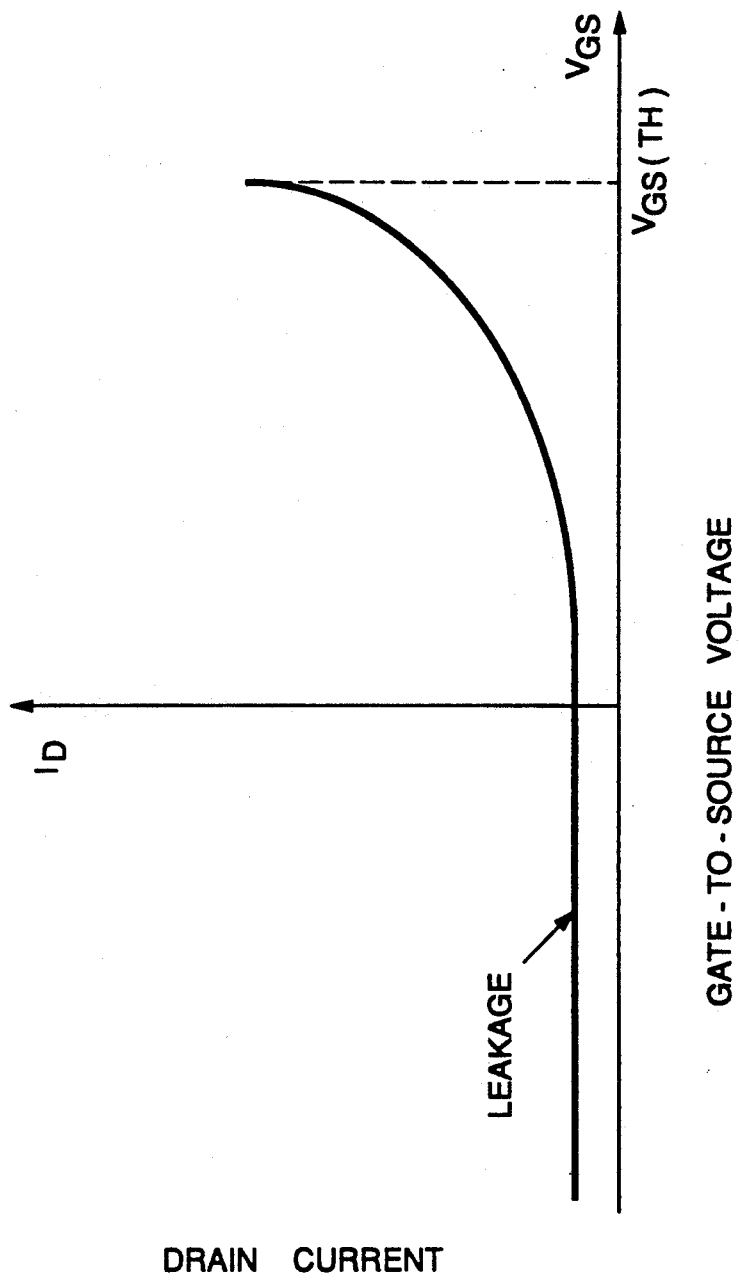
FIG. 4 is a graph illustrating, for an enhancement mode (normally open) N-Channel FET switch used in the battery system of FIGS. 3 and 5-7, how the drain current $I_D$ is controlled by the gate-to-source voltage $V_{GS}$.

Although not the case here, such enhancement mode N-channel FET's are often operated with substrate terminal B externally connected to source terminal S. In such case, the FET becomes a three terminal device with the interesting property that gate-to-source voltage $V_{GS}$ controls the flow of current between the source and drain. As shown in FIG. 4, when $V_{GS}$ is 0 volts or less, only a weak leakage current flows in the drain and $I_D$ is virtually 0; the FET switch between source and drain is OPEN. But when $V_{GS}$ reaches a positive threshold gate voltage $V_{GS(TH)}$, the FET switch begins conducting and the switch between source and drain is CLOSED.

However, in the circuit of S₄ shown in FIG. 3, the substrate terminal B is not connected to the source terminal. In such a case, switch S₄ is OPEN when gate-to-substrate voltage $V_{GB}$ is less than threshold gate voltage $V_{GS(TH)}$ and CLOSED when $V_{GS}$ is equal to or greater than threshold gate voltage $V_{GS(TH)}$.

In the circuit of S₄ the drain D is connected to the anode of cell E₃ and source S is connected to the cell's cathode. During the charging mode, the voltage $V_C$ developed across cell E₃ is a positive voltage. As the arrow on the substrate indicates, the junction between substrate B and source S is a P-N rectifier junction that is forward-biased when substrate B is more positive than source S. The current into substrate terminal B is limited by a limiting resistor R₃ between terminal B and the anode of E₃. Similarly, should the polarity of cell voltage V_C applied to FET switch S₄ reverse during operation of the power supply, the current into substrate terminal B is limited by a limiting resistor R₄ between terminal B and the cathode of E₃.

Therefore, when V_C is positive, substrate B will be at a slightly higher voltage than source S by an amount $V_{BS}$ equal to the forward voltage drop between B and S. In the example of the system power supply, the "Wheatstone" bridge circuit is in a condition of near balance, such as to supply the necessary positive or negative active voltage to activate the gate of the FET switch. It should be pointed out that in the condition of exact balance of the bridge, the voltage applied to the FET gate will be zero.

The gate terminal G of FET 54 is connected at the node of resistors R₁ and R₂, the other ends of which are respectively connected to the anode and the cathode of cell E₃. As the input impedance of insulated gate G is very high, the voltage on gate G is determined by a voltage divider formed by resistors R₁ and R₂ and it is some predetermined fraction of V_C. Therefore, R₁ and R₂ may be selected so that gate-to-source voltage $V_{GS} = V_C \cdot R_2/(R_1+R_2)$ is sufficiently small so that gate-to-substrate voltage $V_{GB}$ can only exceed threshold gate voltage $V_{GS(TH)}$ when voltage V_C is positive and rises substantially above V_P.

In the example of a power supply for a satellite, suppose electronic switch S₄ is to carry a charging current of about 10 microamperes (μA) when the voltage applied between drain D and source S is about 10 volts. Then a 3N170 FET switch with substrate B externally connected to source S would have a threshold gate voltage $V_{GS(TH)}$ of about 1.0~1.2 volts. In the circuit of electronic switch S₄ substrate B is not connected to source S. In order to close the FET switch, gate-to-source voltage $V_{GS}$ must exceed $V_{GS(TH)}$ plus $V_{BS}$, the forward voltage drop between substrate B and source S. In effect, the condition for closing the switch is:

$$V_C \cdot R_2/(R_1+R_2) = V_{GS} \geq (V_{GS(TH)} + V_{BS}) \qquad \text{Eq. 1}$$

Substituting $V_{GS(TH)} = 1.2$ volts and simplifying in terms of cell voltage V_C, the condition for closing switch S₄ is:

$$V_C \geq \frac{(R_1 + R_2)}{R_2}(1.2 \text{ volts} + V_{BS}) \qquad \text{(Eq. 2)}$$

If, for example, when R₁ = R₂, this can be further simplified to:

$$V_C \geq (2.4 \text{ volts} + 2\, V_{BS}) \qquad \text{Eq. 3}$$

But as stated previously, when all the cells are charging properly, voltage V_C across any one of them never exceeds V_P ≈ 1.7 volts. Therefore, in the charging mode if all the cells are operating properly switch S₄ remains OPEN.

Figure 5:
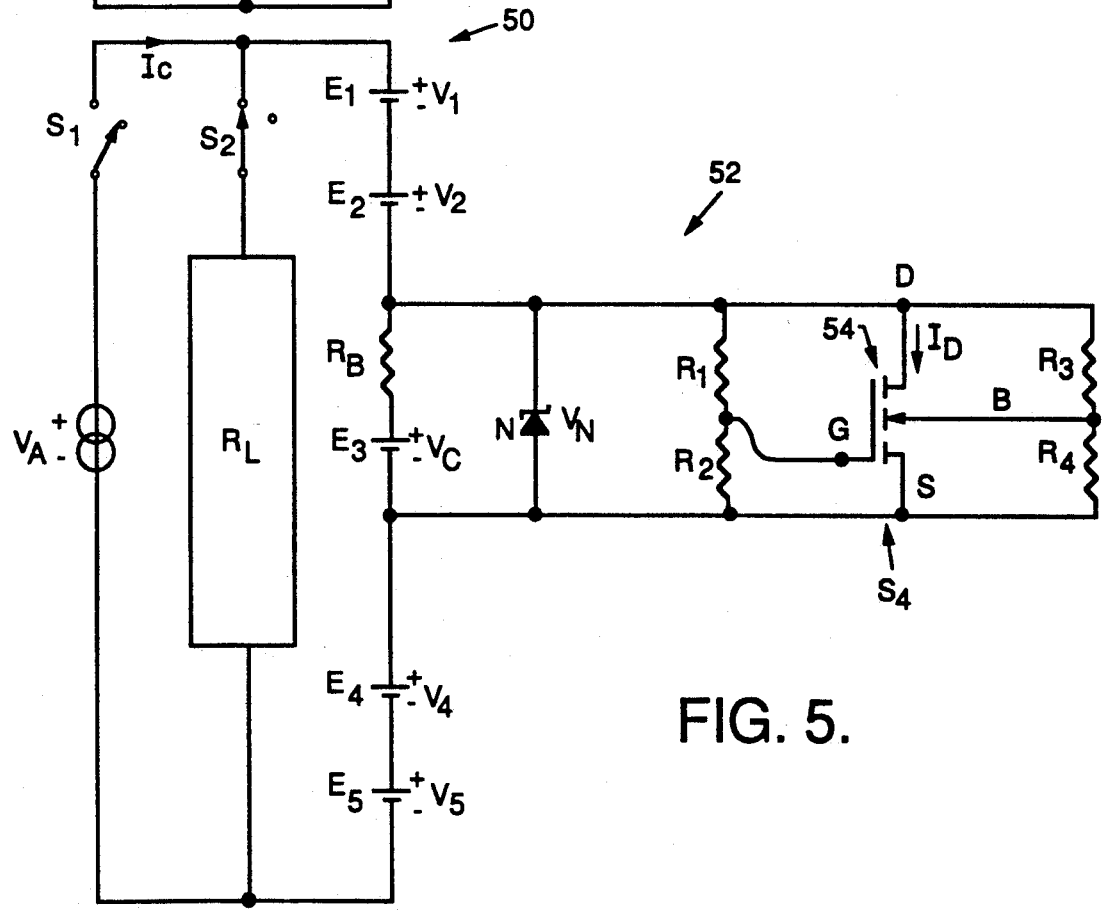
FIG. 5 shows the battery system of FIG. 3 when one of the cells has failed and the remaining normally functioning cells are being charged.

Now suppose that during the charging mode cell E₃ fails as shown in FIG. 5. When cell E₃ fails, its internal impedance becomes substantially higher than that of the remaining good cells. This greatly reduces charging current I_C and also causes a much greater proportion of positive charging voltage $V_A = 5\, V_P$ to appear across E₃.

For example, in the power supply for a satellite $V_A \approx +8.5$ volts and most of this voltage would appear across failed cell E₃. Then in Eq. 3 above, the voltage $V_C \approx +8.5$ volts. Assuming $V_{BS}$ is small (0.5 volt or less), voltage V_C will now be sufficient to close FET switch S₄ during the charging mode.

Once switch S₄ closes, the flow of charging current I_C substantially increases and voltage V_C drops to the minimum voltage needed to keep switch S₄ CLOSED, as given by Eqs. 2 and 3 above. For example, in the satellite power supply, this voltage V_C would be about 1.55 volts for a good cell. Since V_C remains positive even after FET switch S₄ is CLOSED, rectifier N is kept biased OPEN during the charging mode, as shown in FIGS. 3, 5 and 6.

In contrast to the automatic permanent shunting of a defective cell that takes place in the prior art circuit of FIGS. 1 and 2, the automatic shunting of defective cell $E_3$ in the circuit of FIG. 5 during charging is reversible. Suppose cell $E_3$ recovers to normal operation, for example after a period of non-use. As the cell impedance returns to a value like that of the other cells, circuit 50 returns to the state shown in FIG. 3. The voltage $V_C$ drops to no more than $V_P$, which by design is insufficient to keep FET switch $S_4$ "CLOSED". If in the example of the satellite power supply $V_C = V_P \approx +1.7$ volts and Eq. 3 applies, then voltage $V_C$ becomes too low to keep FET switch 54 "CLOSED" and the switch returns to "OPEN". FET switch 54 returns to the normally open state, thus automatically removing the shunt across cell $E_3$ during the charging mode.

Figure 6:
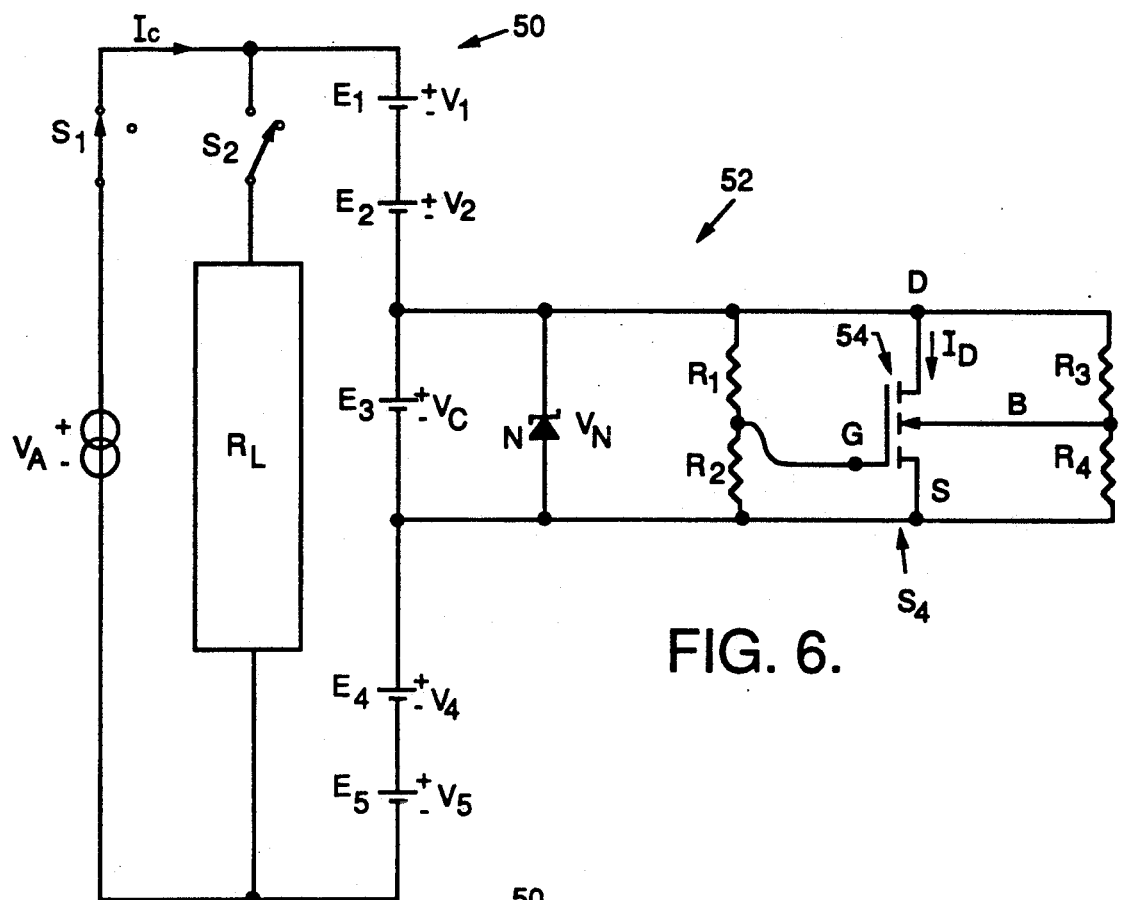
FIG. 6 shows the battery system of FIG. 3 when all the cells are functioning normally and being discharged into a load.

Now suppose all the cells are operating properly and the power supply is in the discharge mode as shown in FIG. 6. Since each cell produces a positive voltage $E_0$, voltage $V_C$ across rectifier N is also $E_0$, which is sufficient to bias the rectifier "OPEN". But voltage $E_0$, which is less than peak voltage $V_P$ during the charging mode, is insufficient to close normally open FET switch 54. In the satellite power supply example, $E_0 \approx +1.5$ volts, which is less than $V_P \approx +1.7$. If $V_C = E_0 \approx +1.5$ volts in Eq. 3, it is insufficient to close the FET switch.

Therefore, when all the cells are operating properly during the discharge mode, both rectifier N and electronic switch $S_4$ are OPEN, and bypass circuit 52 does not affect the functions of battery system 50 or cell $E_3$.

Figure 7:
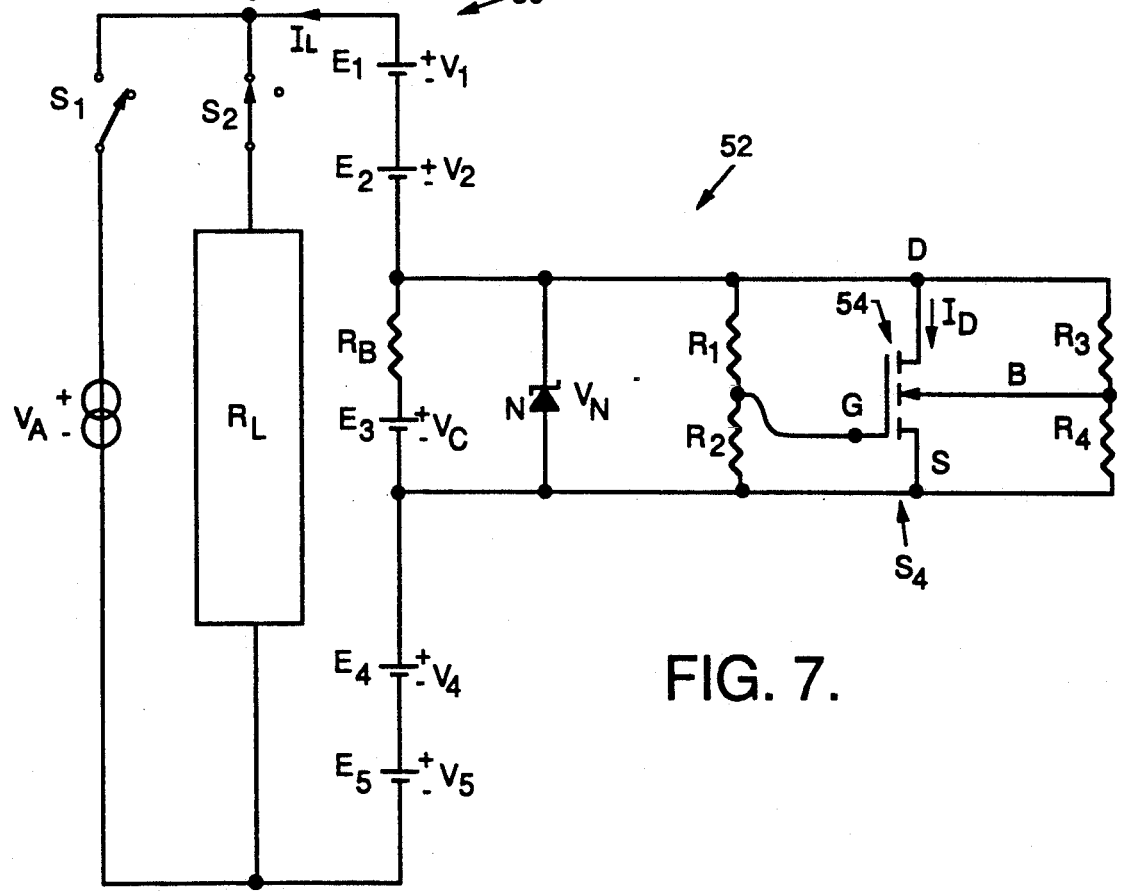
FIG. 7 shows the battery system of FIG. 3 when one of the cells has failed and the remaining normally functioning cells are being discharged into a load.

Now suppose that during discharge, cell $E_3$ fails as shown in FIG. 7. This will exhibit a relatively high internal resistance compared to load $R_L$. The remaining four good cells $E_1$, $E_2$, $E_4$, $E_5$ will then bias rectifier N into the "CLOSED" state so the discharge current $I_L$ is shunted through rectifier N around the failed cell $E_3$.

When rectifier N is CLOSED, its forward voltage is low, typically less than 0.5 volts. A voltage of this small magnitude disables switch $S_4$, preventing it from closing during the discharge mode. The rectifier clamps the cell voltage across bypass circuit 52 at $V_C \approx -0.5$ volts. This negative cell voltage reverses the polarity of the voltages applied to the various terminals of the FET switch when compared to, for example, the circuit condition of FIG. 6. While in principle the FET switch is bi-directional, the rectifier's clamping action when cell $E_3$ fails reduces cell voltage $V_C$ to a magnitude too small to close the FET, thus preventing current from the cell's cathode to anode. Thus, the only automatic shunting to maintain discharge current $I_L$ will be through rectifier N.

In contrast to the automatic permanent shunting of a defective cell that takes place during discharge as in the prior art circuit shown in FIG. 2, there is no mechanism in the present invention corresponding to switch $S_3$ to keep the shunting permanent. The automatic shunting of defective cell $E_3$ in the circuit of FIG. 5 during charging is reversible and ends automatically if the failed cell recovers.

Suppose cell $E_3$ recovers to its normal healthy condition, for example after a period of non-use. As its impedance returns to a value like that of the other cells, circuit 50 returns to the state shown in FIG. 6. The voltage $V_C$ will be restored to $+E_0$, which by design is sufficient to keep bias rectifier N in the OPEN state but insufficient to close FET switch 54. Rectifier N returns to the normally open state, automatically removing the shunt across cell $E_3$ during the discharge mode.

In this manner bypass circuit 52 provides reversible automatic shunts of a failed cell for the charging and discharge modes. If a failed cell recovers to normal operation electrical constraints previously applied to it are automatically removed. The reversible automatic shunting bypass circuit can be made compact, simple and reliable by forming it from semiconductor devices, such as a rectifier and a normally open FET switch.

While the present invention is described with reference to embodiments for particular rechargeable power supply applications, it is suitable for a wide variety of applications and realizable with many different embodiments. Those skilled in the art will recognize that many variations may be employed without departing from the scope of the invention as set forth in the claims.

What is claimed is:

1. A bypass circuit for a rechargeable battery cell having cell anode and cell cathode terminals and receiving a charging current and producing a discharge current, the bypass circuit comprising:
   first switching means for automatically shunting the discharge current between the cell anode and cell cathode terminals if the battery cell fails and for automatically terminating said shunting of discharge current if the battery cell recovers; and
   second switching means for automatically shunting the charging current between the cell anode and cell cathode terminals if the battery cell fails and for automatically terminating said shunting of charging current if the battery cell recovers.

2. The bypass circuit of claim 1 wherein the first switching means shunts the discharge current in a first direction and the second switching means shunts the charging current in a second direction opposite to the first direction.

3. The bypass circuit of claim 2 wherein the first switching means includes a rectifier oriented so its forward direction is the first direction.

4. The bypass circuit of claim 2 wherein a cell voltage $V_C$ between the cell anode and cell cathode terminals has a normal peak charging voltage $V_P$ when the battery cell is operating normally and the second switching means includes a normally open electronic switch which closes when the cell voltage $V_C$ substantially exceeds the normal peak charging voltage $V_P$.

5. The bypass circuit of claim 1 wherein the second switching means includes a normally open FET switch which shunts the charging current if the battery cell fails but reopens if the battery cell recovers.

6. A rechargeable battery system comprising:
   a direct voltage generator;
   a plurality of cells coupled in series, each having cell anode and cell cathode terminals;
   positive and negative output terminals for connecting an electrical load;
   first switching means for coupling the direct voltage generator in series with the cells to receive a charging current during a charging mode;
   second switching means for coupling the positive and negative output terminals in series with the cells to produce a discharge current during the discharge mode; and
   bypass means coupled to at least one of the cells, said bypass means having
   third switching means for automatically shunting the discharge current between the cell anode and cell cathode terminals of the cell to which it is coupled if said cell fails and for automatically terminating said shunting of discharge current if said cell recovers, and fourth switching means for automatically shunting the charging current between the cell anode and cell cathode terminals of the cell to which it is coupled if said cell fails and for automatically terminating said shunting of charging current if said cell recovers.

7. The rechargeable battery system of claim 6 wherein the third switching means shunts the discharge current in a first direction and the second switching means shunts the charging current in a second direction opposite to the first direction.

8. The rechargeable battery system of claim 7 wherein the third switching means includes a rectifier oriented so its forward direction is the first direction.

9. The rechargeable battery system of claim 7 wherein a corresponding cell voltage $V_C$ between the cell anode and cell cathode terminals of each cell has a normal peak charging voltage $V_P$ when the corresponding cell is operating normally and the second switching means includes a normally open electronic switch which closes when the cell voltage $V_C$ of the cell to which the bypass means is coupled substantially exceeds the normal peak charging voltage $V_P$.

10. The rechargeable battery system of claim 6 wherein the second switching means includes a normally open FET switch which shunts the charging current if the cell to which the bypass means is coupled fails but reopens if said cell recovers.

* * * * *